E. NICHOLSON.
WAVE MOTOR.
APPLICATION FILED OCT. 22, 1913.
1,166,473.  Patented Jan. 4, 1916.
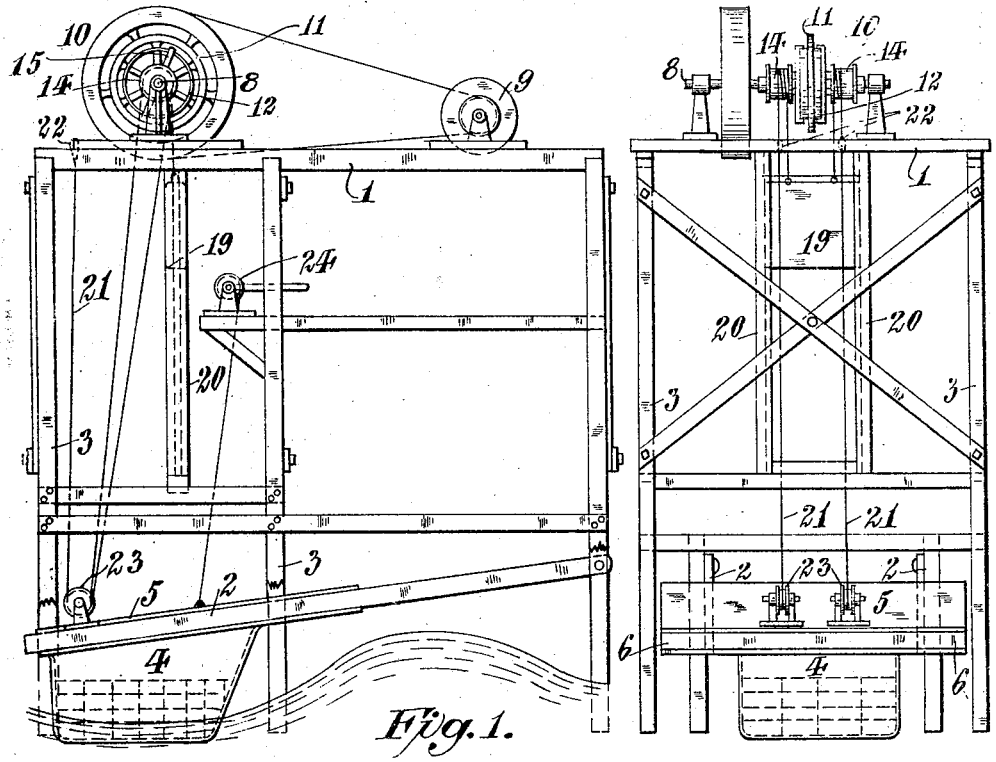
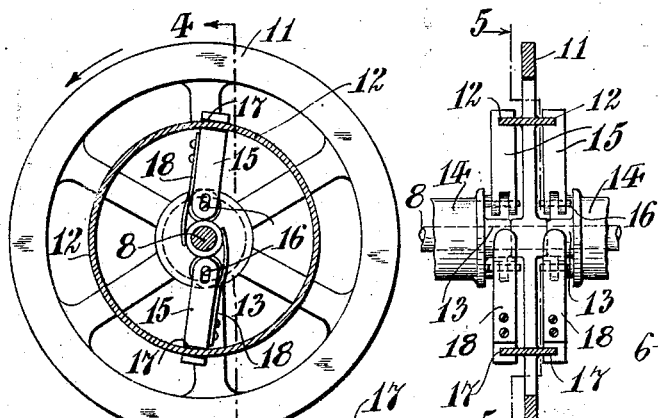
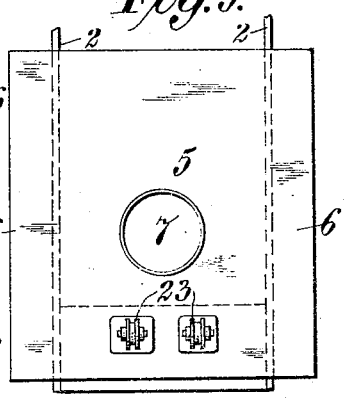
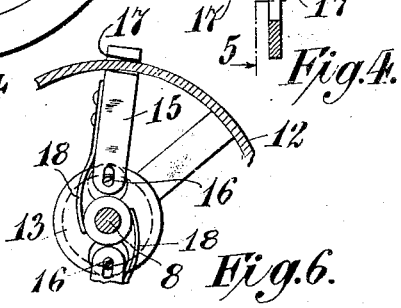

UNITED STATES PATENT OFFICE.

EZRA NICHOLSON, OF CLEVELAND, OHIO.

WAVE-MOTOR.

1,166,473.  Specification of Letters Patent.  Patented Jan. 4, 1916.

Application filed October 22, 1913. Serial No. 796,551.

*To all whom it may concern:*

Be it known that I, EZRA NICHOLSON, a citizen of the United States, residing in the city of Cleveland, county of Cuyahoga, and State of Ohio, have invented certain new and useful Improvements in Wave-Motors, of which the following is a specification.

My invention relates to a wave motor and one of the objects of the invention is to provide a simple means for converting the rise and fall of a wave actuated member into a continuous rotary movement of a shaft for conveying power.

Another object of the invention is to provide a simple connection between the float and shaft arranged to multiply the relatively small movement of the float, and a still further object is to provide a clutch mechanism between the float and the driven shaft designed so that there will be a minimum lost motion between the parts and so that the members will be brought into quick positive engagement at each change in direction of movement of the float.

Various other objects of the invention will be more fully set forth in the following description of one form of mechanism embodying the invention which consists broadly in providing a wave motor including a weighted float, the downward movement of which simultaneously rotates a line shaft and raises a weight; and the fall of which weight acts on the shaft to continue its rotation as the float is raised by the waves so that there will be a continuous rotation of the shaft as long as there is any movement of the float and other new and novel features of construction and combination of parts hereinafter set forth and claimed.

Referring to the accompanying drawings: Figure 1 is a side elevation of a wave motor disclosing a preferred embodiment of my invention; Fig. 2 is a front elevation of the same; Fig. 3 is a plan view looking down upon a portion of the float; Fig. 4 is a transverse sectional view of the improved form of clutch taken on the line 4—4 of Fig. 5; Fig. 5 is a side elevation of the clutch partly in section on the irregular line 5—5 of Fig. 4 looking in the direction indicated by the arrows; and Fig. 6 is an enlarged detailed view of a portion of the clutch shown in Fig. 5.

In the particular embodiment of my invention shown in the accompanying drawings, a suitable supporting frame 1 has pivotally mounted thereon a float 2, the free end of which is materially weighted, and disposed in position between suitable guides 3 to be actuated vertically by the waves. The weighting ballast is arranged in a compartment 4, the top of which includes a platform 5 projecting beyond the side walls to form aprons 6, which prevent water from being thrown on top of the float. A manhole 7 in the platform provides access to the interior of the compartment.

A driven line shaft 8 is suitably journaled upon the frame 1, above the float 2, and is suitably connected to some driven machine, such as the generator 9. A compound clutch 10 is mounted upon the shaft 8, which clutch includes a wheel 11 fixed to the shaft and having peripheral ring flanges 12 outstanding from each side thereof. A pair of hubs 13 having pulley drums 14 attached thereto are loosely mounted upon the shaft 8 and on opposite sides of the wheel 11. Each hub has a pair of dogs 15 extending outwardly in opposite direction parallel to the wheel which dogs have their inner ends pivoted to the hub 13 by means of a slot and pin connection 16. The outer end of each dog is disposed slightly in the rear of a radius passing through the connection 16 in the direction of rotation of the wheel and has a transverse recess 17 containing the edge of the adjacent flange 12. Each dog has a leaf spring 18, the free end of which bears upon the advancing side of the periphery of the hub 13 tending to maintain the dog out of engagement with the flanges 12.

A shaft actuating weight 19 of less weight than the float 2 is mounted for vertical movement in guides 20 preferably forming part of the frame 1. A pair of flexible members 21 having their ends 22 attached to the frame are first passed about a pulley 23 on the float and are then passed several times about the drums 14 and have their other ends attached to the weight 19. One of the flexible members 21 is wrapped about one of the drums in one direction and the other member about the other drum in the opposite direction so that the downward movement of the float will drive one drum in one direction and the downward movement of the weight will positively drive the other drum in the same direction. A winch 24 may be utilized to raise the float into inoperative position if desired.

In operation with the parts as shown in Figs. 1 and 2 and with the weight 19 in raised position, the action of the waves on the float 2 will tend to raise the free weighted end of the float and permit the weight 19 to fall to its lowered position, which action will throw one of the sets of dogs 15 into positive engagement with the flange 12 to drive the wheel 11 and shaft 8. At the same time the flange 12 on the other side of the wheel passes through the slots 17 of the other set of dogs, the falling weight taking up the slack in the members 21 and acting on the other drum to drive the same backward. The fall of the waves will then permit the float 2 to drop to a lowered position which action will draw on the members 21, simultaneously acting upon the weight 19 to move the same into the raised position shown in Fig. 2 and to move the set of dogs which were inoperative on the downward movement of the weight 19, into shaft driving engagement through their engagement with the wheel 11. This action is continued, first the falling weight driving the shaft and then the falling float both driving the shaft and raising the weight.

The springs 18 tend to maintain the dogs 15 in such position that the flanges 12 can freely pass through the slots 17 when the drums 14 rotate clockwise, looking at Fig. 5, but when the drive of the drums is anticlockwise the dogs 15 will assume a greater angular position and grip the flange 12, thus causing the rotation of the wheel 11 and shaft 8 as indicated by the arrow.

By means of a structure of this character it is possible continually to rotate the line shaft so long as there is any movement of the float 2 even though the movement be relatively slow. It will be particularly noted that the shaft is positively and continually driven by the alternate falling of the float and weight. While it has been known to utilize a weight to take up the slack in a float actuated flexible pulley member, this is merely incidental with the device herein disclosed and the falling weight 19 is primarily for the purpose of driving the shaft 8. The pulley connection between the float and weight is such that a relatively small velocity of these members is multiplied at the drums 14 to give a relatively high angular velocity to the shaft 8.

The form of clutch mechanism disclosed, while of general application, is particularly efficacious in a device of this character. It quickly and positively connects the parts with a minimum amount of lost motion and is noiseless both while driving and while changing from one drive to the other.

While I have described but one set of shaft driving devices it is obvious that one or more of these mechanisms may be mounted to rotate the driven shaft and they may be so arranged relative to the wave formation that an upward movement of one float may take place during the downward movement of another float and it is also obvious that various other changes within the skill of the mechanic may be made without departing from the spirit of the invention provided the means set forth in the following claims are employed.

Having thus described my invention, I claim:—

1. In a wave motor, the combination with a supporting frame having a float pivoted thereto and pulleys on a movable portion of said float, of a driven shaft having a wheel fixed thereto, hubs loosely mounted on said shaft and on opposite sides of said wheel, pulley drums affixed to said hubs, a vertically movable weight, means for guiding said weight, flexible connections passed about said pulleys and drums and affixed to said weight, and spring pressed dogs pivoted to each of said hubs and adapted to clutch said wheel to drive the shaft when actuated by said float or weight.

2. In a wave motor, the combination with a wave actuated member, of a driven shaft, a pair of clutch members operatively connected with said shaft when driven in opposite directions, a shaft driving weight, a connection between said member, clutch members and weight for simultaneously driving said shaft and moving said weight into a raised position during the movements of the member in one direction and a connection between said clutch members and said weight when falling for continuing the rotation of the shaft while the member is moving in the other direction.

3. In a wave motor, the combination with a wave actuated member and a shaft adapted to be driven thereby, of a raised weight capable of positively driving said shaft while falling, a driving connection between said falling weight and shaft operable on the upward movement of said member, said connection comprising a one-way clutch having one element fixed to the shaft, said clutch constituting means for disconnecting said member during its upward movements from its operative connection with said shaft.

4. In a wave motor, the combination of a wave actuated member having a pair of pulleys mounted thereon, a driven shaft, a vertically movable weight, a pair of clutch members, each operatively connected to the shaft to drive the shaft in the same direction, a pair of flexible connections each having one end fixed and the other end attached to the weight, said connections each passed about one of said pulleys and about one of said clutch members in oppposite directions whereby the falling of the wave-actuated-member will actuate the shaft while raising the weight and the falling weight will actuate the shaft while the wave member is being lifted by the waves.

This specification signed and witnessed this 20th day of October, A. D., 1913.

EZRA NICHOLSON.

ᴖed in the presence of—